Sept. 26, 1944. J. M. WALTER 2,358,897
PLANING TOOL
Filed May 19, 1943 2 Sheets-Sheet 1
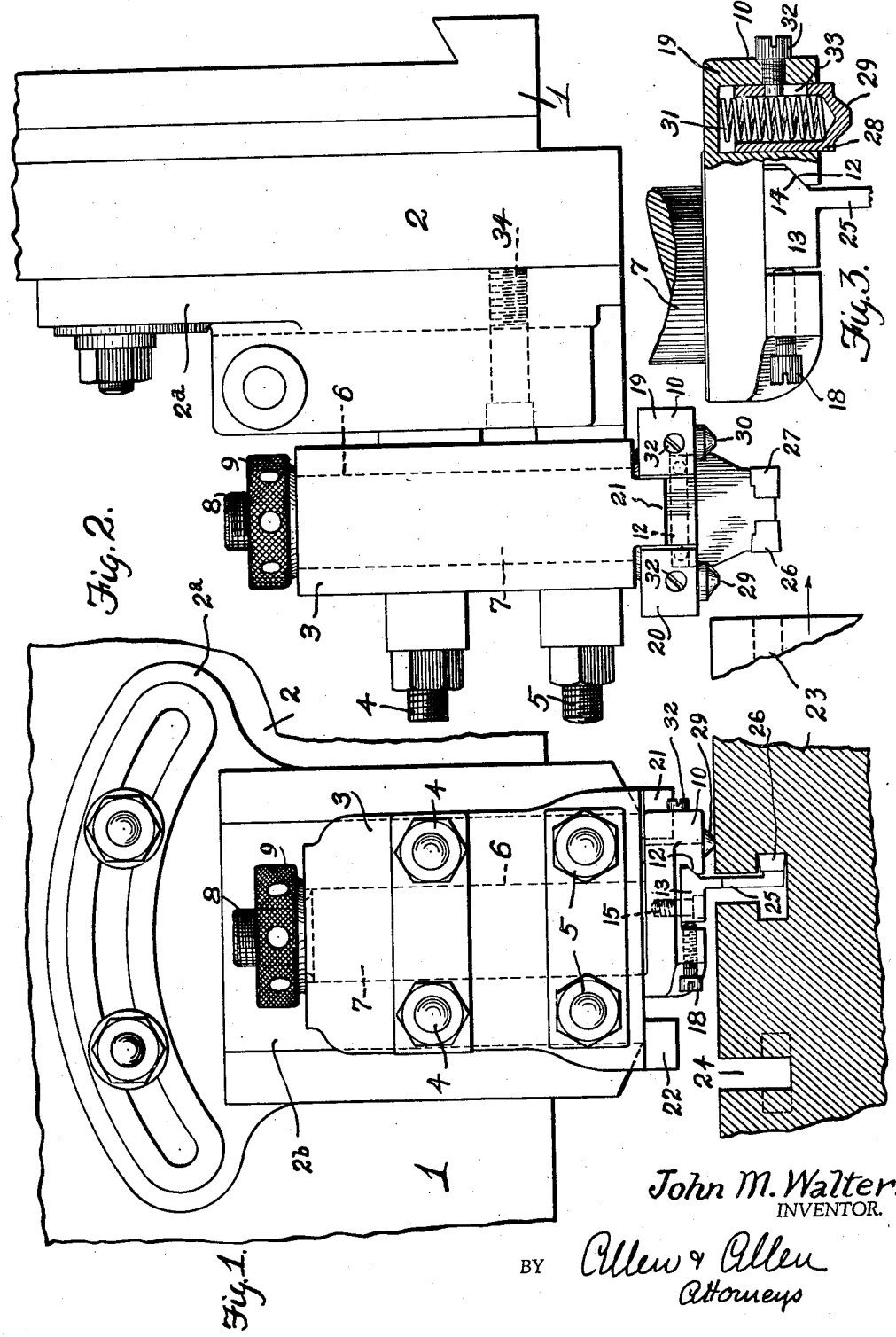
John M. Walter.
INVENTOR.
BY Allen & Allen
Attorneys Sept. 26, 1944.   J. M. WALTER   2,358,897
PLANING TOOL
Filed May 19, 1943   2 Sheets-Sheet 2
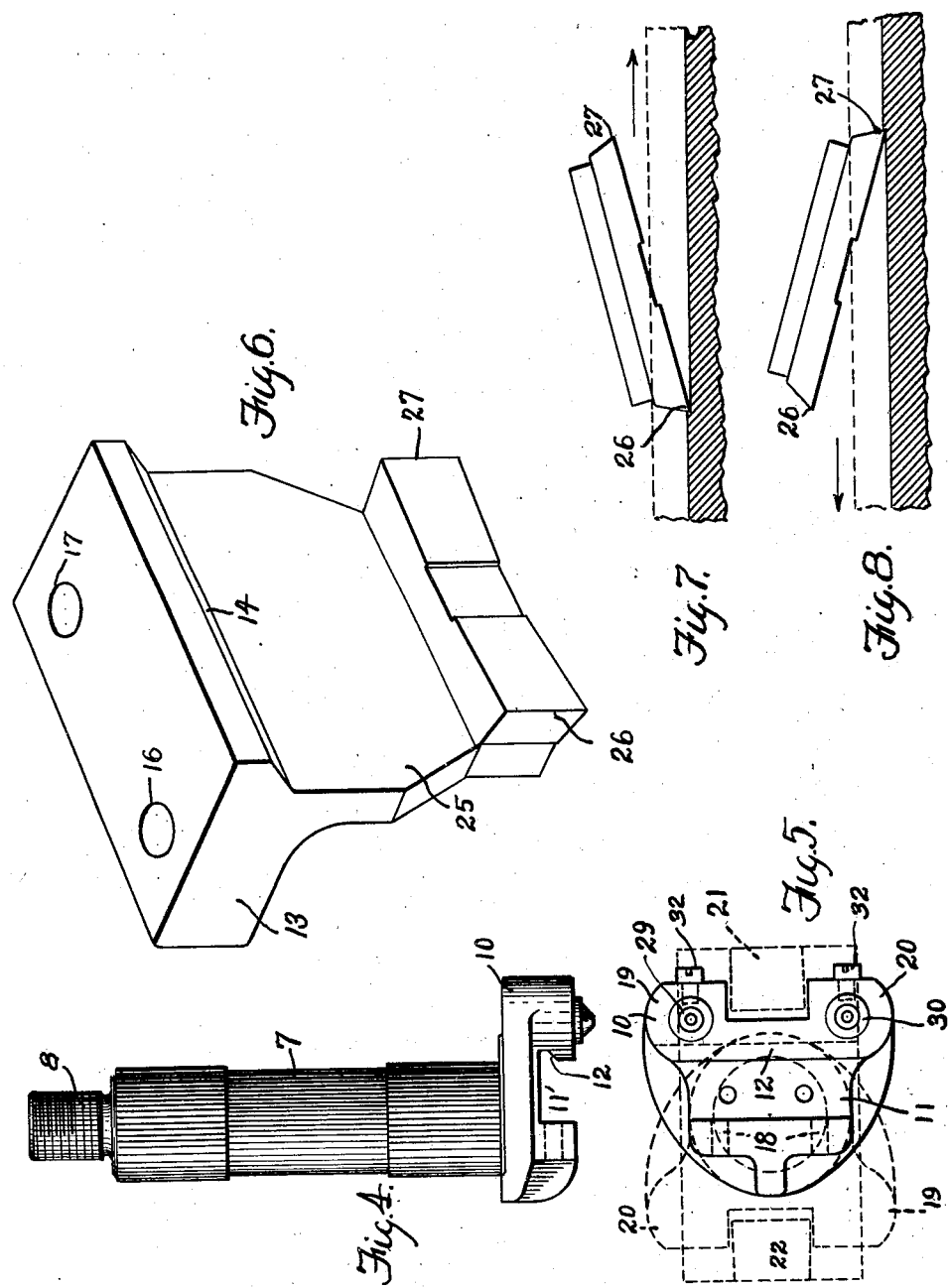
John M. Walter, INVENTOR.
BY Allen & Allen
Attorneys Patented Sept. 26, 1944

2,358,897

UNITED STATES PATENT OFFICE 2,358,897

PLANING TOOL

John M. Walter, Cincinnati, Ohio, assignor to The G. A. Gray Company, Cincinnati, Ohio, a corporation of Ohio Application May 19, 1943, Serial No. 487,611

7 Claims. (Cl. 90—52)

My invention relates to metal planers or like machine tools in which the work and tools move relatively to each other in forward and back strokes. In the conventional metal planer there is a bed on which a table or platen is slidably mounted, together with means for moving the table in both directions under power. At each side of the bed there are uprights connected by a cross rail on which one or more rail heads or saddles are mounted. Tool holders are affixed to rams on the rail heads. The work to be planed is affixed to the table. The feeding of the tools to the work is accomplished by moving the ram or the rail head or both. In conventional practice the tools cut the work upon the traverse or movement of the table in one direction only, and are idle during the return stroke of the table.

The principal object of my invention has to do with means and a method for accomplishing cutting on both strokes of the table. It is an object of my invention to accomplish this through the use of relatively inexpensive mechanism which can be attached to or used upon standard planing equipment. It is an object of my invention to provide a structure having two tools, one to be used for cutting during each stroke of the table, together with means for selectively bringing these tools into operation.

It is an object of my invention to provide tool positioning means so that tools may be positioned for cutting respectively on forward and return strokes of the table, and to provide a positioning means which is work-controlled or otherwise automatic in its operation, for actuating the tool.

It is an object of my invention to provide a mechanism enabling the operator to cause the tools to cut the work on both strokes of the table without otherwise varying the procedure of planing.

These and other objects of my invention, which will be set forth hereinafter or will be apparent to one skilled in the art upon reading these specifications, I accomplish by that certain construction and arrangement of parts and by that method of which I shall now describe an exemplary embodiment. Reference is made to the accompanying drawings wherein:

Figure 1 is an elevational view of my exemplary structure as applied to a conventional planer, a portion of the work being shown in section.

Figure 2 is a side elevation thereof.

Figure 3 is a partial elevational view on an enlarged scale showing in section one of the poppet members which I employ.

Figure 4 is an elevational view of a trunnion and a fixture to receive the tool.

Figure 5 is a similar view taken from beneath, but showing in dotted lines the relation of the fixture to the block which holds the trunnion.

Figure 6 is a perspective view of a double-edged tool.

Figures 7 and 8 are diagrammatic and exaggerated views showing the action of the double-edged tool in cutting on the forward and on the return strokes.

The aforesaid exemplary embodiment of my device, which will herein be illustrated and described, is a structure for cutting T-slots in planer tables or like equipment. In the light of my teachings, however, it will be apparent that the principles involved may be applied to other types of planing. Planer tables will be understood as provided with a series of longitudinally extending T-slots in which bolts may be engaged for the clamps which hold the work to the planer table. In the formation of very large planer tables, it is not practicable to mill these slots. The practice has been first to plane a vertical slot or groove in the table top and then, using an offset tool, to cut sidewise at the base of the first mentioned slot. The tool cuts only on one stroke of the table, so that the undercutting of the T-slots has been unduly prolonged and inconvenient.

In the practice of my invention, I provide a double tool having cutting edges disposed in opposite directions. This tool is effectively mounted upon a pivot so that upon movement of the table in one direction, it may be tilted into a cutting position using one cutting edge, while upon movement of the table in the opposite direction, it may be tilted in the other direction so as to bring the other cutting edge into operation. Stop means are provided to limit the tilting of the tools, so that a proper depth of cut may be had on both strokes as determined by the ordinary tool feeding mechanism. Next, the work itself is arranged to effect the tilting of the tools so that the positioning of the tools occurs automatically by reason of the reversals of the table.

Referring to Figures 1 and 2, a rail head is indicated at 1 and will be understood as slidably mounted on the cross rail of the planer in the usual way and provided with the usual feeding mechanism. A ram 2 is mounted in the rail head and may be made adjustable as to position in the conventional manner. A clapper box may be present as at 2a; but if so, it is not used as a clapper box, since my invention contemplates cutting on both strokes on the table.

A trunnion block 3 is rigidly fastened to the clapper block 2b as by means of bolts 4 and 5. The trunnion block has a central bore or perforation 6 within which is mounted the trunnion 7 shown in Figure 4. The upper end of this trunnion may be reduced and threaded as shown at 8 for the acceptance of a collar 9 which, when fastened in place, will prevent the downward movement of the trunnion 7 in the bore 6, while permitting the rotation thereof. The trunnion has a smooth fit in the bore in the trunnion block so that it can rotate without undue friction and without play.

On the lower end of the trunnion, I fasten a tool holder block, indicated at 10. This block is provided with a groove 11, one portion of which is undercut and provided with a slanting face, as at 12. The tool holder block may be made integral with the trunnion if desired.

In Figures 1 and 6 I have indicated the tool as having a base 13 shaped to be accepted by the groove 11. At one side of the base, there is a projection having a slanting face 14 to mate with the slanting face 12. The base 13 may be held to the tool holder block 10 by bolts 15, passing through perforations 16 and 17 in the base; and it may be accurately located by means of one or more screws 18 engaged in threaded openings in the tool holder block 10 and acting to move the tool base 13 sidewise, until its slanting face 14 tightly engages the slanting face 12 on the tool block.

The tool block 10, as shown in Figures 2 and 5, is provided with spaced ears 19 and 20. These ears coact with one of a pair of ears 21 and 22 machined on the trunnion block 3. The spacing of the ears 19 and 20 on the tool holder block is greater than the width of the ears 21 or 22 on the trunnion block by a distance which will permit the desired tilting or rotation of the tool holder block on the trunnion as a pivot. Since in the particular embodiment I am employing my apparatus for undercutting the cross portion of a T-slot in a piece of work such as a planer table indicated at 23 in Figures 1 and 2, I desire to be able to do cutting with the same tools on each side of the vertical slot 24, so that I desire to be able to move my tool block 10 from the position shown in full lines in Figure 5 to the position shown in the dotted lines in the same figure. Hence, the provision of two ears on the trunnion block 3 with either one of which the ears 19 and 20 will cooperate and in the same way.

For the particular type of work involved in the exemplary embodiment, in Figure 6 I show the tool as having a relatively long but wide depending shank 25, which bears cutting bits or tools proper as shown at 26 and 27. The structure of Figure 6 may be an integral structure, or it may be one made up of parts bolted or otherwise fastened together, as will be apparent. Thus, the shank and the base may constitute in effect a tool holder to which the tools themselves are detachably affixed. In any event, however, the tools proper, as indicated at 26 and 27, will preferably be so disposed that their cutting edges are equidistant from the pivot axis established by the trunnion 7. When this is done, cutting can be accomplished on both strokes by tilting the tool holder block on the trunnion, so as to bring first one and then the other of the cutting edges into cutting position at the end of each stroke. If the ears are asymmetrically configured, it is possible to do cutting on either stroke while feeding for but one stroke. The same result may be accomplished with a symmetrical configuration of the ears (and therefore symmetrical rocking of the trunnion), by making the cutting edges asymmetrical with respect to the axis of the trunnion. It is also possible to arrange both the ears and the cutting edges symmetrically and feed for both strokes.

The cutting action is illustrated in Figures 7 and 8, though in an exaggerated manner. In Figure 7 the work is moved to the right in the direction of the arrow, and the tool is tilted so that the cutting edge 26 is in cutting position and is operating. On the return stroke, as illustrated in Figure 8, the work is moving to the left in the direction of the arrow, and the tool has been tilted so as to bring the cutting edge 27 into operative position.

The angle through which the tool is tilted is small (usually but a few degrees), and is determined by the amount of play between the ears 19 and 20 on the tool holder block and the ear 21 (or alternatively the ear 22) on the trunnion block. But my invention also contemplates the provision of work-actuated means for accomplishing the tilting at the end of each stroke. In a perforation in each of the ears 19 and 20, I mount a poppet member. This member has a hollow cylindrical body 28, open at one end and closed at the other. The closed end is configured to present a tapered or conical contacting portion 29 or 30. The coiled compression spring 31, engaged within the hollow of the poppet member and abutting the top of the perforation in the ear, urges the poppet member downwardly. It is prevented from coming out of its perforation by the engagement of the shank of a screw 32, threaded into the ear, in an elongated slot 33 cut in the body of the poppet member.

The mode of operation of this structure will be clear from Figure 2. A stroke of the planer table to the left has just been completed, and the tool and tool holder block have moved off the end of the work. The work 23 now begins to move to the right in the direction of the arrow. The conical portion 30 of the left-hand poppet in the figure will contact the end of the work. The work will press the poppet upwardly so that it can slide beneath it; but first it will tilt the tool holder block 10 toward the right of Figure 2. The tool will now be positioned so that the cutting edge 26 will engage and cut the work while the work is moving to the right. Upon the completion of that stroke, the tool and tool holder block will again move off the work; and when the next stroke begins, the engagement of the work with the conical portion 29 of the right-hand poppet will tilt the tool block 10 to the left in Figure 2, thus bringing the cutting edge 27 into position for cutting.

While I have described my invention in connection with an offset tool for a special purpose, its utility is not confined to the undercutting of grooves to form T-slots. With no more change in structure than a possible change in shape of the tool itself by elongating or configuring the shank 25, it will be evident that the structure disclosed is suitable for accomplishing vertical planing on the sides of a work piece fastened to the planer table. For horizontal planing, I can dispose my trunnion 7 horizontally and place the poppets on the ends of the arms attached to the tool holder block. It is not necessary that the tool holder block be actuated by the work itself, since it could be similarly actuated by abutments on the planer table or by other means moved by the planer table or its drive. It is not necessary that the trunnion block 3 be attached directly to the rail head or the clapper box. Where deep vertical planing is to be done, a reach may be attached to the ram head 2, and my trunnion block fastened to this reach. Where the trunnion block 3 is for convenience attached to the clapper of a clapper box, the clapper will be rigidly held against pivotal movement, as by a series of bolts 34, shown in Figure 2.

Modifications may be made in my invention without departing from the spirit of it. Having thus described my invention in an exemplary embodiment, what I claim as new and desire to secure by Letters Patent is:

1. In a device of the character described, a trunnion block, a trunnion rotatably mounted therein, a tool holder block mounted on the trunnion, an ear on one of said blocks, and a pair of spaced ears on the other of said blocks, the distance between said last mentioned ears being greater than the width of the first mentioned ear, and the first mentioned ear being located between the last mentioned ears so as to limit the rocking movement of said tool holder block about said trunnion as a pivot, and a pair of poppet members having slanting faces for contacting work being planed, said poppet members being resiliently mounted with respect to said tool block and in such positions that when the tool block has moved off the end of a work piece, upon the commencement of a reverse stroke, one of said poppet members will contact the work and tilt said tool holder block.

2. In a device of the character described, a trunnion block, a trunnion rotatably mounted therein, a tool holder block mounted on the trunnion, an ear on one of said blocks, and a pair of spaced ears on the other of said blocks, the distance between said last mentioned ears being greater than the width of the first mentioned ear, and the first mentioned ear being located between the last mentioned ears so as to limit the rocking movement of said tool holder block about said trunnion as a pivot, and a pair of poppet members having slanting faces for contacting work being planed, said poppet members being resiliently mounted with respect to said tool block and in such positions that when the tool block has moved off the end of a work piece, upon the commencement of a reverse stroke, one of said poppet members will contact the work and tilt said tool holder block, said trunnion block having in addition an oppositely disposed ear, and said trunnion having releasable means for holding it in said trunnion block so that the position of said tool holder may be reversed.

3. In a device of the character described, a trunnion block, a trunnion rotatably mounted therein, a tool holder block mounted on the trunnion, an ear on one of said blocks, and a pair of spaced ears on the other of said blocks, the distance between said last mentioned ears being greater than the width of the first mentioned ear, and the first mentioned ear being located between the last mentioned ears so as to limit the rocking movement of said tool holder block about said trunnion as a pivot, in combination with a tool mounted on said tool holder block and having oppositely disposed cutting edges adapted to be brought into cutting position alternately by rocking motions of said tool holder block.

4. The structure of claim 1 in combination with a tool mounted on said tool holder block and having oppositely disposed cutting edges adapted to be brought into cutting position alternately by rocking motions of said tool holder block.

5. The structure of claim 2 in combination with a tool mounted on said tool holder block and having oppositely disposed cutting edges adapted to be brought into cutting position alternately by rocking motions of said tool holder block.

6. In a structure for accomplishing metal planing upon relative movement of a tool and a work piece in both directions, a double tool having cutting edges oppositely disposed and adapted to be brought into cutting position alternatively by a rocking motion of the tool through less than 45°, means for mounting the tool upon an axis whereby to permit the said rocking motion, means for limiting the rocking motion to less than 45°, and means for effecting the said limited rocking motion at the commencement of each relative movement of the work and tool, the said cutting edges of the said tool being equidistant from the said axis but the means for limiting the rocking motion as aforesaid being asymmetrical whereby one of the said cutting edges by the said rocking motion is brought into a cutting plane further toward the center of the work, so that only one feeding motion is required for each cutting cycle involving relative movement of the work and the tool in both directions.

7. In a structure for accomplishing metal planing upon relative movement of a tool and a work piece in both directions, a double tool having cutting edges oppositely disposed and adapted to be brought into cutting position alternatively by a rocking motion of the tool through less than 45°, means for mounting the tool upon an axis whereby to permit the said rocking motion, means for limiting the rocking motion to less than 45°, and means for effecting the said limited rocking motion at the commencement of each relative movement of the work and tool, the said means for limiting the rocking motion being asymmetrically arranged but the said cutting edges of the tool being located at different distances from the said axis, so that but one feeding movement is required for a cutting cycle involving relative movement of the work and the tool in both directions.

JOHN M. WALTER.